C. J. FORD.
SHOCK ABSORBER.
APPLICATION FILED MAY 23, 1921.
1,435,058.
Patented Nov. 7, 1922.
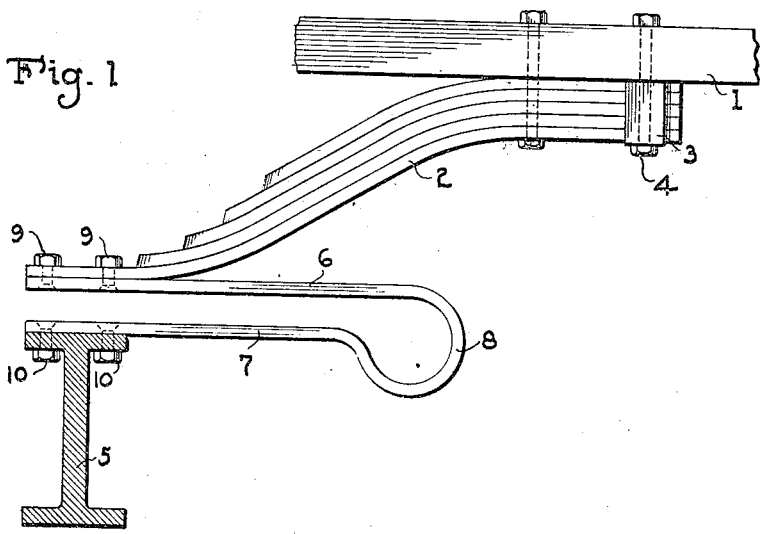
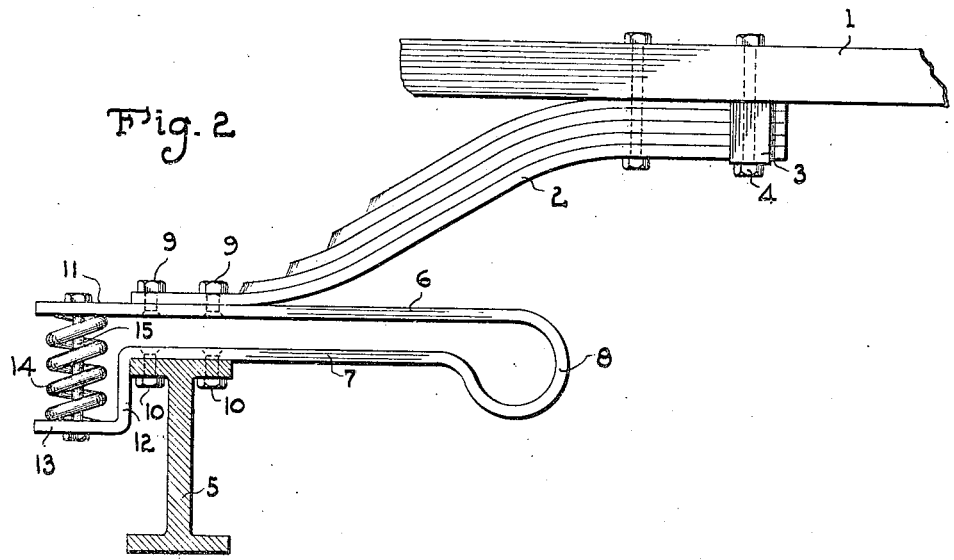
Claud J. Ford
INVENTOR Patented Nov. 7, 1922.

1,435,058

UNITED STATES PATENT OFFICE.

CLAUD J. FORD, OF PORTLAND, OREGON.

SHOCK ABSORBER.

Application filed May 23, 1921. Serial No. 471,605.

*To all whom it may concern:*

Be it known that I, CLAUD J. FORD, a citizen of the United States, residing at Portland, in the county of Multnomah and State of Oregon, have invented a new and useful Shock Absorber, of which the following is a specification.

This invention relates to shock absorbers and is more particularly directed to a new and improved means for diminishing strains that occur as the vehicle body of an automobile moves in opposition to the movement of the running gear.

The invention contemplates the use of a resilient means adapted to be located between the end of a cantilever vehicle spring and the vehicle axle and comprises two arms, elements or levers flexibly connected, one of the arms being rigidly connected to the axle and the other arm rigidly connected to the end of the vehicle spring.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:

Fig. 1 is a side elevation of the shock absorber and shows the simplest form of my invention.

Fig. 2 is a side elevation of a modified form of the shock absorber.

The device consists generally of a pair of substantially parallel flexibly connected members, one arranged above the other, the upper member being rigidly connected to a vehicle spring and the lower one rigidly connected to the axle of an automobile. A spring may be, and preferably is, employed in one form of the device, between the two parallel members to assist in maintaining these members substantially parallel and further assist in absorbing shocks due to sudden changes in speed of the automobile.

In the drawings, a fragmentary portion of the automobile body is shown at 1, to which is secured a vehicle spring 2, by means of a U-shaped member 3, and the bolts 4 which pass through perforations in the member 3 and the spring 2, and likewise through perforations in the body member 1 of the vehicle. The axle 5 is connected to the spring 2 by means of my improved shock absorber which broadly comprises parallel arms, or levers 6 and 7, flexibly connected to each other, as shown at 8. The flexible connection is in the form of an integral loop which provides a spring means for maintaining the arms 6 and 7 in spaced relation. The outer end of the arm or lever 6 is rigidly connected to the free end of the spring 2 by bolts 9, while the outer end of the arm 7 is rigidly connected transversely of the axle 5 by bolts 10.

The arms or levers 6 and 7 may be made of either resilient or non-resilient material depending on which form is to be employed.

In the form shown in Fig. 2, a modification is disclosed in which the outer end of the arm 6 has a perforated straight portion 11 extended beyond the end of the spring 2, while the arm 7 is extended downwardly at 12 and outwardly to provide an offset portion 13 for seating a spring 14 which engages the extension 11. A perforation is formed in the offset portion 13 and in alinement with the perforation in the extension 11. The arms 6 and 7 are secured in spaced relation by means of the spring 14 and a bolt 15 inserted through the alined perforations in the portion 13 and extension 11. The spring 14 and bolt 15 provide a cushion for spacing the ends of the levers 6 and 7, while the bolt 15 provides an adjustment for the levers and likewise a means for limiting the outward movement of the lever 6 with relation to the lever 7.

In operation, the device disclosed in Fig. 1 has greater flexibility than the shock absorber shown in Fig. 2, since the outer ends are free, permitting a greater variation in the expansion of the flexible connection 8.

Both forms in cooperation with the main springs will absorb shocks equally as well when properly applied, since the greater freedom of movement of the shock absorber of Fig. 1 is properly compensated for in the use of the coil spring 14 of Fig. 2.

The action of the device disclosed in Fig. 2 is obvious, since the spring 14 will absorb the shock which results when the automobile wheel encounters an obstruction, and together with the spring arms 6 and 7 absorb certain shocks before the more rigid main springs are brought into play.

It will also be observed that the end of the spring 2 will have considerably more play and therefore is adapted to distribute the strains by reason of the improved connection between the end of the spring and the axle.

In both forms, the two arms, members or levers are rigidly connected respectively to one end of the vehicle spring and to the front axle, the arms, members or levers extending inwardly toward the center of the vehicle and immediately beneath the main vehicle spring thereof.

What is claimed is:—

1. In a shock absorber for vehicles for use with a vehicle spring, a pair of arms integrally and flexibly connected at their inner ends and arranged one above the other and transversely of a vehicle axle, one of said arms being rigidly connected at its outer end to the end of a vehicle spring, and the other arm being rigidly connected to the vehicle axle, the flexible connection between the arms being free and unsupported.

2. In a shock absorber for vehicles for use with a vehicle spring, a pair of arms arranged one above the other and integrally and flexibly connected at their inner ends, one of said arms being rigidly connected to the end of the vehicle spring, the other arm being rigidly connected to the vehicle axle, an offset portion formed on the end of the second-mentioned arm remote from said flexible connection, and a coil spring located within the offset portion and engaging the first-mentioned arm.

3. In a shock absorber for vehicles for use with a vehicle spring, a pair of arms arranged one above the other, means integrally and flexibly connecting said arms together, one of the arms being rigidly connected to the end of a vehicle spring, the other arm being rigidly connected to the rear axle, and means located at one side of the flexible connection of the arms for resiliently holding the said arms in a normal position.

4. In a shock absorber for vehicles for use with a vehicle spring, a repair of arms arranged one above the other, means integrally and flexibly connecting said arms together, the end of one of the arms being rigidly connected to the end of a vehicle spring, the end of the other arm being rigidly connected to the rear axle, and means located at the end of the arms remote from said flexible connection of said arms and outside the axle for resiliently holding the said arms in a normal position.

5. In a shock absorber, the combination with a vehicle axle and a vehicle spring, of a pair of arms arranged one above the other, means for flexibly and integrally connecting said arms, means for rigidly connecting the lower arm to the axle transversely thereof, means for rigidly connecting the upper arm to the end of the vehicle spring, said arms extending from said axle inwardly toward the center of the vehicle and in vertical alinement with said vehicle spring, and a coil spring acting upon the upper arm to absorb shocks.

In testimony, that I claim the foregoing as my own, I have hereto affixed my signature.

CLAUD J. FORD.